(12) United States Patent
Ovadia

(10) Patent No.: US 10,592,703 B1
(45) Date of Patent: Mar. 17, 2020

(54) METHOD AND SYSTEM FOR PROCESSING VERIFICATION TESTS FOR TESTING A DESIGN UNDER TEST

(71) Applicant: Cadence Design Systems, Inc., San Jose, CA (US)

(72) Inventor: Meir Ovadia, Rosh Ha-Ayin (IL)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/207,133

(22) Filed: Dec. 1, 2018

(51) Int. Cl.
| | | |
|---|---|---|
| G06F 17/50 | (2006.01) | |
| G01R 31/28 | (2006.01) | |
| G06F 30/3323 | (2020.01) | |
| G06F 30/3312 | (2020.01) | |
| G06F 119/12 | (2020.01) | |

(52) U.S. Cl.
CPC ...... *G06F 30/3323* (2020.01); *G06F 30/3312* (2020.01); *G01R 31/28* (2013.01); *G06F 2119/12* (2020.01)

(58) Field of Classification Search
CPC ............ G06F 17/504; G06F 17/5031; G06F 17/5081; G06F 217/84; G06F 11/00; G06F 30/3323; G06F 30/3312; G06F 2119/12; G01R 31/28
USPC ...... 716/108, 111, 134, 136; 703/16, 17, 19; 714/33, 732, 741
See application file for complete search history.

(56) References Cited

U.S. PATENT DOCUMENTS

| | | | |
|---|---|---|---|
| 6,279,124 B1* | 8/2001 | Brouwer | G06F 11/263 714/38.11 |
| 9,792,402 B1* | 10/2017 | Ovadia | G06F 17/5081 |
| 10,235,417 B1* | 3/2019 | Sterin | G06F 16/24568 |
| 2005/0027783 A1* | 2/2005 | Green | G06F 11/3476 709/200 |
| 2005/0065987 A1* | 3/2005 | Telkowski | G06F 11/0727 |
| 2013/0173691 A1* | 7/2013 | De Schacht | G06F 11/1471 709/203 |

OTHER PUBLICATIONS

CHO (Korean Patent Document No. KR-2004032311-A, published Apr. 17, 2004, abstract and 1 drawing). (Year: 2004).*

* cited by examiner

*Primary Examiner* — Phallaka Kik

(74) *Attorney, Agent, or Firm* — Pearl Cohen Zedek Latzer Baratz LLP

(57) ABSTRACT

A method for processing verification tests for testing a design under test (DUT), may include receiving from a user a start time message and an end time message for each action of actions in a verification test in a target code form, to be printed into a log file of an execution of the test, so as to list chronologically the start time and end time of each of the actions in the log file. The method may also include executing the verification test to obtain the log file with the start time and end time messages and, using a processor, analyzing the log file to construct a graph representation of the validation test, based on the printed start and end times of the actions of the test.

20 Claims, 8 Drawing Sheets

METHOD AND SYSTEM FOR PROCESSING VERIFICATION TESTS FOR TESTING A DESIGN UNDER TEST

FIELD OF THE INVENTION

The present invention relates to verification and more particularly to methods and systems for processing verification tests for testing a design under test (DUT).

BACKGROUND

Design verification is a common process for testing a newly designed integrated circuit, board, or system-level architecture, to, for example, confirm that it complies with the requirements defined by the specification of the architecture for that device. Design verification for a device under test (DUT) may be performed on the actual device, but can usually be a simulation model of the device is tested.

Verification of electronic designs typically has three forms. At an early stage, before the electronic design is implemented in hardware, simulation can be conducted on a model of the design. Another form can be emulation, in which one electronic hardware is used to mimic the behavior of another (tested) electronic hardware. At more advanced stages of design development a system on chip can be validated, in a process which is typically referred to as post-silicon validation. Post-silicon validation can be a last stage in the electronic design development, for example, before it is manufactured.

Post-silicon validation tests can be carried out on actual devices running at speed on realistic system boards, the results of which can be assessed by a logic analyzer and other validation tools.

In a typical verification process an electronic design undergoes testing which includes designing various validated testing scenarios which are generated as code and executed.

Verification tests typically include a plurality of actions that are to be executed, in order to test the validity of the DUT planned design.

SUMMARY

There is thus provided, according to some embodiments of the present invention, a method for processing verification tests for testing a design under test (DUT). The method includes receiving from a user a start time message and an end time message for each action of a plurality of actions in a verification test in a target code form, to be printed into a log file of an execution of the verification test, so as to list chronologically the start time and end time of each of the actions in the log file. The method also includes executing the verification test to obtain the log file with the start time and end time messages; and using a processor, analyzing the log file to construct a graph representation of the validation test, based on the printed start and end times of said plurality of actions of the test.

In some embodiments of the present invention the user is prompted to input the start time and end time messages.

In some embodiments of the present invention the method further includes obtaining from the user additional messages to be printed into the log file.

In some embodiments of the present invention in the constructed graph representation of the validation test an action of said actions is linked by a line to another action of said actions if the end time of that action precedes the start time of the other action, and there are no other actions of said actions whose both start time and end time occurred between the end time of that action and the start time of the other action.

In some embodiments of the present invention in the reconstructed graph representation of the validation test, if the start time of one action precedes the start time of another action but the start time of the other action precedes the end time of that action, then these two actions are presented as concurrent actions.

In some embodiments of the present invention the method further includes using the processor, applying one or a plurality of functions on the graph representation of the verification test, using an EDA tool.

In some embodiments of the present invention said plurality of functions is selected from the group of functions consisting of debugging, identifying errors in the test or in the DUT, identifying errors in a testbench of the DUT, and applying constraints.

There is also provided, according to some embodiments of the present invention, a non-transitory computer readable storage medium for processing verification tests for testing a design under test (DUT), having stored thereon instructions that when executed by a processor will cause the processor to receive from a user a start time message and an end time message for each action of a plurality of actions in a verification test in a target code form, to be printed into a log file of an execution of the verification test, so as to list chronologically the start time and end time of each of the actions in the log file; to execute the verification test to obtain the log file with the start time and end time messages; and using a processor, to analyze the log file to construct a graph representation of the validation test, based on the printed start and end times of said plurality of actions of the test.

There is also provided, according to some embodiments of the present invention, a system for processing verification tests for testing a design under test (DUT), the system including a memory and a processor configured to: receive from a user a start time message and an end time message for each action of a plurality of actions in a verification test in a target code form, to be printed into a log file of an execution of the verification test, so as to list chronologically the start time and end time of each of the actions in the log file; to execute the verification test to obtain the log file with the start time and end time messages; and to analyze the log file to construct a graph representation of the validation test, based on the printed start and end times of said plurality of actions of the test.

BRIEF DESCRIPTION OF THE DRAWINGS

In order to better understand the present invention, and appreciate its practical applications, the following figures are provided and referenced hereafter. It should be noted that the figures are given as examples only and in no way limit the scope of the invention. Like components are denoted by like reference numerals.

DETAILED DESCRIPTION OF EMBODIMENTS OF THE INVENTION

Figure 1A:
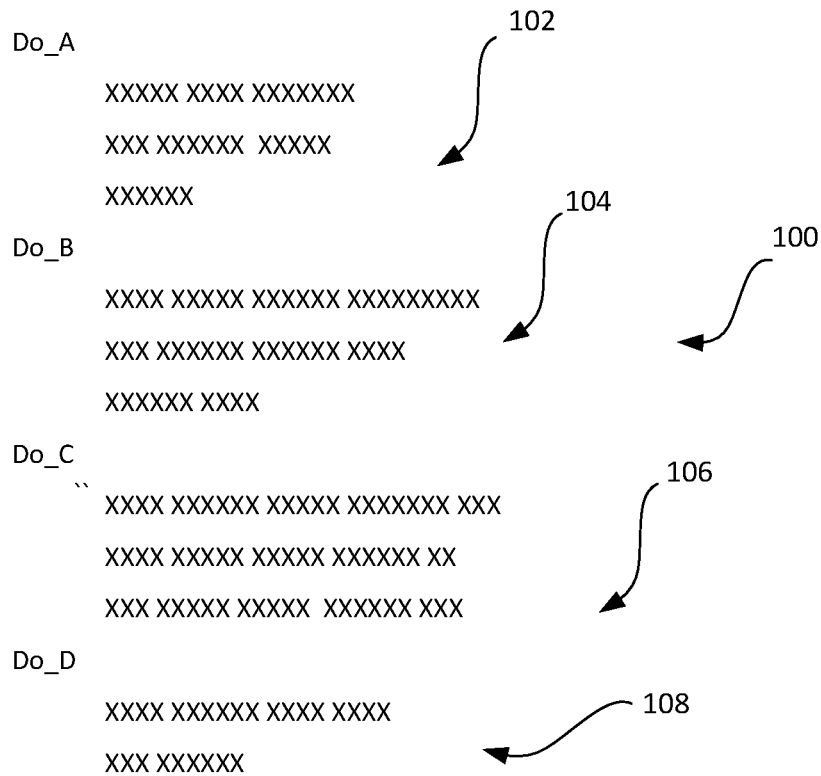
FIG. 1A shows a target code representation of a test.

In the following detailed description, numerous specific details are set forth in order to provide a thorough understanding of the methods and systems. However, it will be understood by those skilled in the art that the present methods and systems may be practiced without these specific details. In other instances, well-known methods, procedures, and components have not been described in detail so as not to obscure the present methods and systems.

Although the examples disclosed and discussed herein are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method examples described herein are not constrained to a particular order or sequence. Additionally, some of the described method examples or elements thereof can occur or be performed at the same point in time.

Unless specifically stated otherwise, as apparent from the following discussions, it is appreciated that throughout the specification, discussions utilizing terms such as "adding", "associating" "selecting," "evaluating," "processing," "computing," "calculating," "determining," "designating," "allocating" or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within the computing system's memories, registers or other such information storage, transmission or display devices.

An electronic system (e.g., a smartphone) may typically be made up of a plurality of electronic devices (e.g., memory, camera, central processing unit—CPU, graphical processing unit—GPU, microphone, media player, etc.). At the early stages in the development of electronic design, a model of each of the electronic devices that form the electronic system can be built (typically in Verilog or other HDL language and verified, by simulating executions of a multitude of tests on the on a simulation of the device under test (DUT). In order to, for example, efficiently cover all (or substantially all) functionalities of the DUT a plurality of tests can be generated. The plurality of tests can be pieces of code, e.g., C-code, assembly, and/or other codes as are known in the art. Each of the plurality of tests can be generated from one of various scenarios which can be constructed by a one or a plurality of users. Each scenario can be made up of a plurality of actions which the user selects to be included in the scenario. The user may also define the order in which the selected actions are to be performed—consecutively or concurrently.

An electronic design automation (EDA) tool was introduced (e.g., a system verifier) that allows a user to view and work on a graph representation of a scenario or to construct and rearrange the scenario by dragging actions (actually symbols of such actions) from a set of available actions into a designated space in a graphical user interface, to form a graph representation of a desired verification test, defining the relations between the selected actions (the order in which they are to be performed—e.g., sequentially or in parallel), to define a scenario. Typically, the graph representation of the scenario is a directed graph, where actions of the scenario are vertices (nodes) and are connected by directed edges.

A scenario may include, for example, a set of actions put together by a validation expert (hereinafter—"user") in a graph representation form, that is eventually converted into target code file and used for testing the DUT.

Such an EDA tool may be used in the construction of verification tests and in verifying that these tests comply with various constraints and system requirements.

A validated scenario—that appears to comply with system requirements and with test constraints—may then be converted by the EDA tool into a test by generating a target code file, which is an executable code, such as, for example, C-code or Assembly. That test may be fed to the DUT in the validation process to test its design.

Working on a graph representation may make it easier for the human user to see and understand relations between actions, and may consequently increase the efficiency and productivity of a debug expert to work with validation tests.

In the generation process of verification tests, using an EDA tool working with graph representation form, the EDA tool may automatically implant various messages (e.g., printout information relating to the test) in the generated target code file, which is designed to help the user understand the logical flow and statuses of the test. When the test is executed, a log file may be generated that includes these messages, and the user may view these messages in order to verify a proper execution or to discover flaws or bugs. These messages offer the user information on what happened and when during the execution of the test.

However, even before the introduction of an EDA tool that involves working on a graph representation of tests, many verification tests had been accumulated, which were not originally produced in graph form rather in target code form (e.g., C-code, Assembly, etc.). Alternatively, various verification tests may have been made, without the use of such an EDA tool, where the user actually wrote the code directly, without going first through a graph representation of the test.

Verification experts may wish to utilize various capabilities and functions of an EDA tool that incorporates graph representations of verification tests in conjunction with verification tests that were directly written in their target language code.

FIG. 1A shows a target code representation 100 of a test. Test 100 may include four actions, e.g., A, B, C and D, which may be arranged sequentially, in four code blocks A (denoted by 102), B (104), C (106) and D (108). The XXXs represent various code lines. While the code blocks are arranged in a serial order, the order of execution of each action may not necessarily be sequential.

Figure 1B:
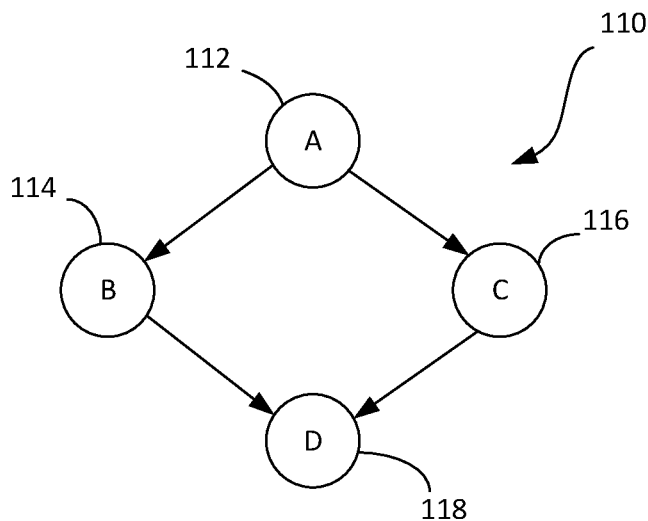
FIG. 1B shows a graph representation of the same test whose target code is depicted in FIG. 1A, according to some embodiments of the present invention.

FIG. 1B shows a graph representation 110 of the same test whose target code is depicted in FIG. 1A, according to some embodiments of the present invention. Actions A (112), B (114), C (116) and D (118) are nodes in graph 110, arranged in a manner indicating that action A 112 is to be executed first, followed by actions B 114 and C 116, which are to be executed concurrently, and when actions B and C have been completed, action D 118 is to be executed.

Figure 2:
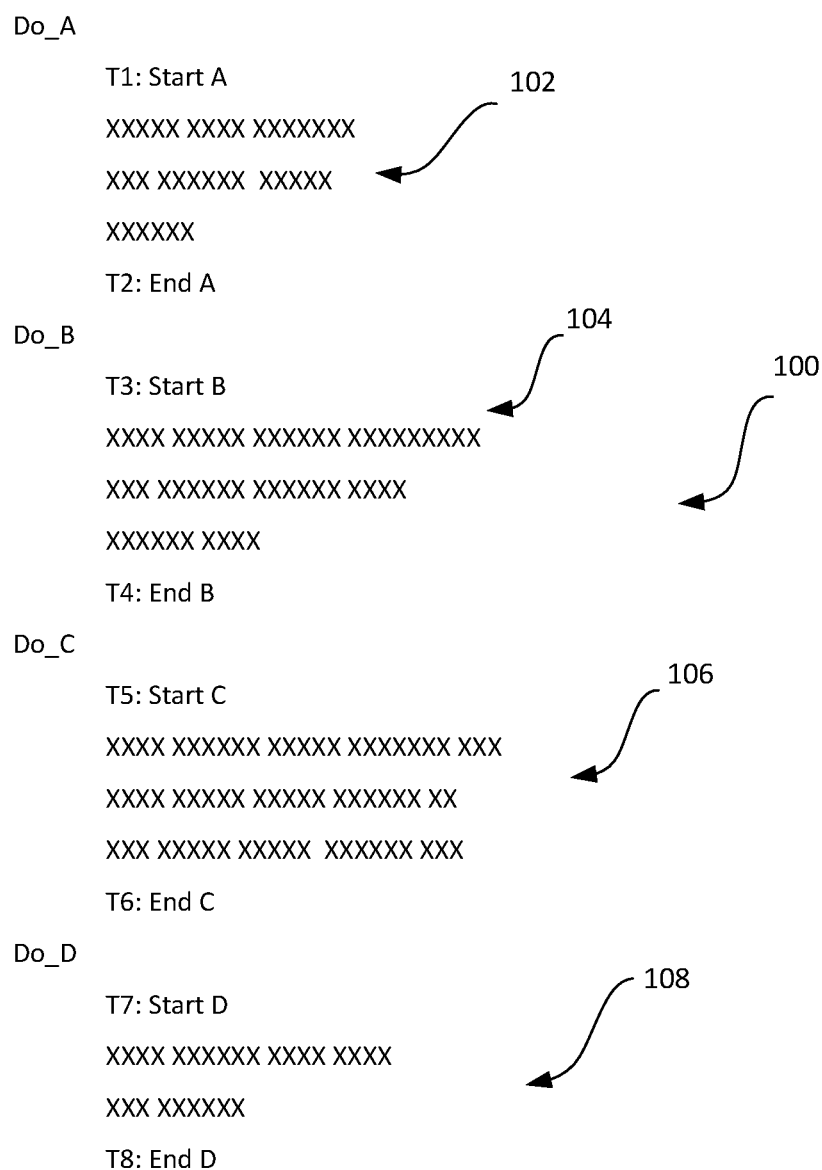
FIG. 2 shows a target code representation of the test of FIG. 1A, with user-defined messages, according to some embodiments of the invention.

FIG. 2 shows a target code representation of the test of FIG. 1A, with user-defined messages, according to some embodiments of the invention.

According to some embodiments of the invention, a user may be prompted or otherwise asked to input messages to be printed during execution of the test, e.g., in a log file, by implanting a message print command in the target code of the test, e.g., print f (print command in C language), Cout (print command in C++), out (print command in E), etc. For example, for each action the user may input a message indicating a start time of an action and a message indicating an end time of that action.

The user may also add other messages relating to features of interest of the user in the target code of the test.

The EDA tool, according to some embodiments of the invention, automatically parses and analyzes the log file generated when the test was executed, to determine the order of the actions, based on the start and end times of each action.

Figure 3A:
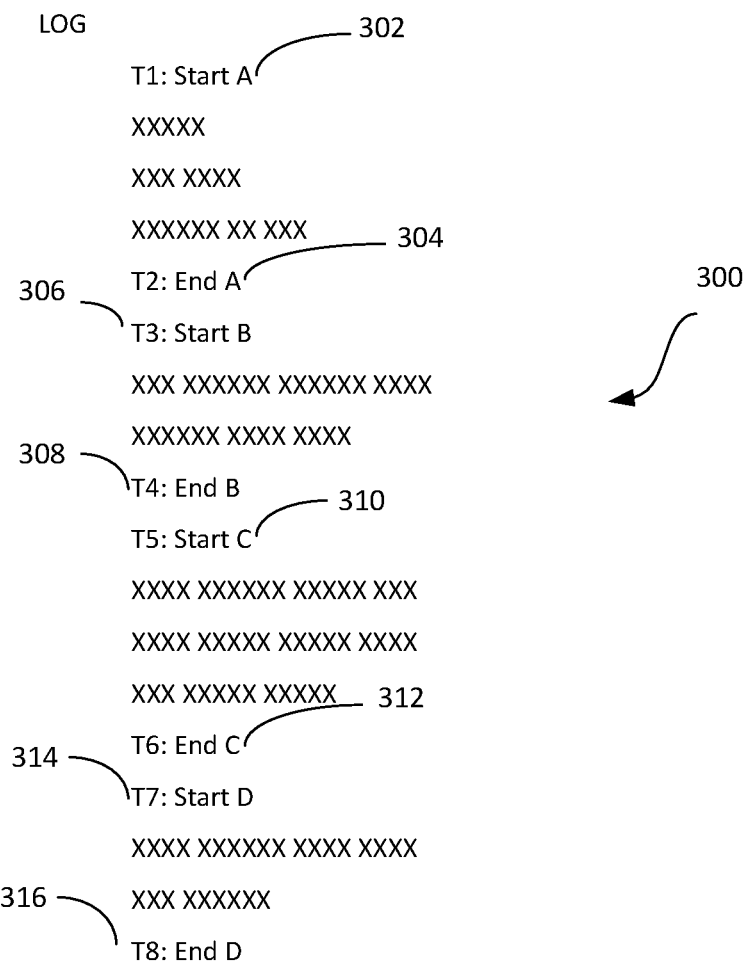
FIG. 3A shows a log file generated during an execution of a verification test that includes start and end time messages relating to actions of that test that were implanted by a user, according to some embodiments of the present invention.

For example, see FIG. 3A showing a log file 300 that was generated during an execution of a verification test that includes start and end time messages relating to actions of that test that were implanted by a user, according to some embodiments of the present invention.

The EDA tool may automatically parse and analyze the log file 300 to find and identify start and end times of the actions included in that test. The analysis is carried out chronologically in order to determine the start times and end times of all actions, their relative order, and whether some or all of the actions were executed in a consecutive order or concurrently.

For example, in the log file shown in FIG. 3A it is evident that the first start time of an action is the start time T1 of action A 302. Moreover, action A ended 304 before any other action started, so a graph representation of the verification test may be generated, starting off by placing action A at the top. The next time stamp is the start time of action B 306, followed by the end time of that action 308. Then there is the start time of action C 310, followed by the end time 312 of that action, and finally action D starts at time 314 and ends at time 316.

Figure 3B:
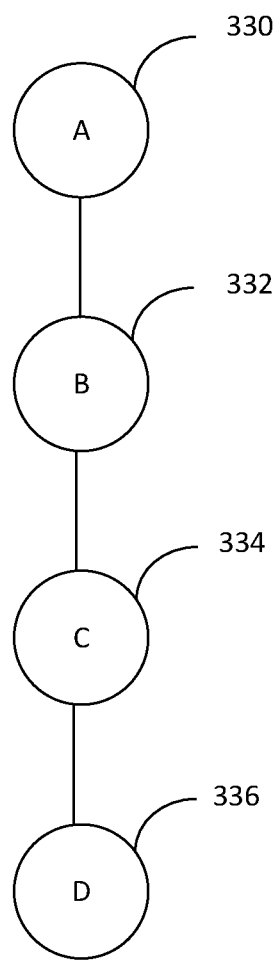
FIG. 3B is a graph representation of the verification test of FIG. 3A that is reconstructed based on user-implanted start time and end time of the test actions, according to some embodiments of the present invention.

FIG. 3B is a graph representation of the verification test that is reconstructed based on user-implanted start time and end time of the test actions, according to some embodiments of the present invention. Given that each of the actions involved in that test started and finished before the next action started, the graph presentation of that test is in fact a sequential arrangement of consecutive actions, shown as nodes A (330), B (332), C (334) and D (336).

Figure 4A:
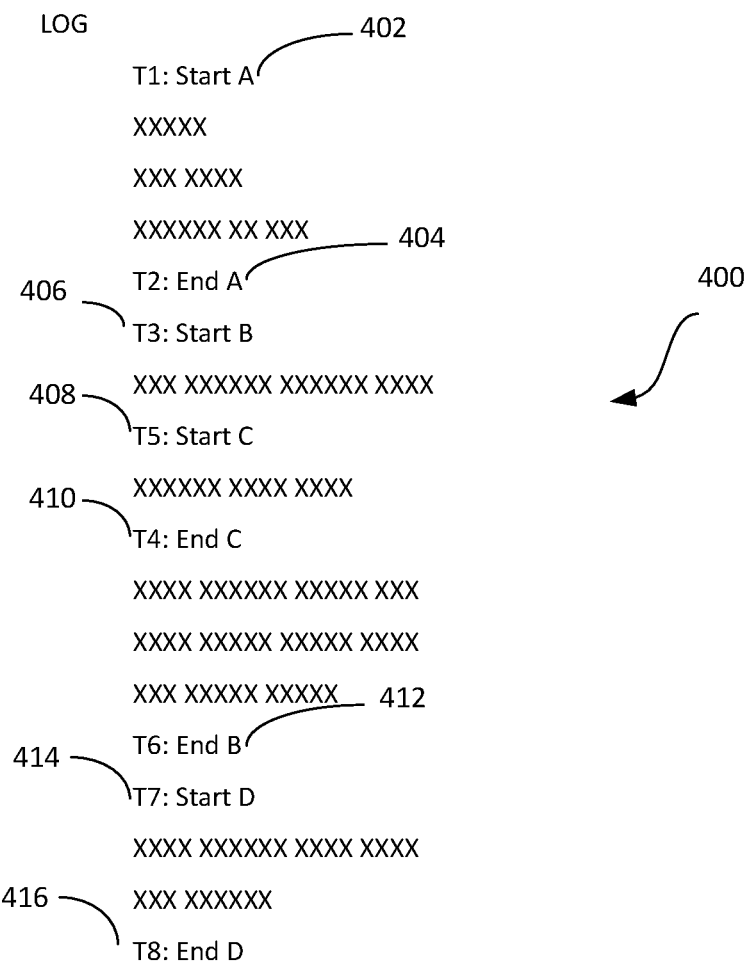
FIG. 4A shows a log file generated during an execution of another verification test that includes start and end time messages relating to actions of that test that were implanted by a user, according to some embodiments of the present invention.

FIG. 4A shows a log file 400 generated during an execution of another verification test that includes start and end time messages relating to actions of that test that were implanted by a user, according to some embodiments of the present invention.

In the example of FIG. 4A, Action A starts first 402 and ends 404, before action B commences 406. However, before action B ends, action C starts 408. Action C then ends 410, and afterwards, action B ends 412 too. After both actions B and C have ended, action D starts 414 and later ends 416.

Figure 4B:
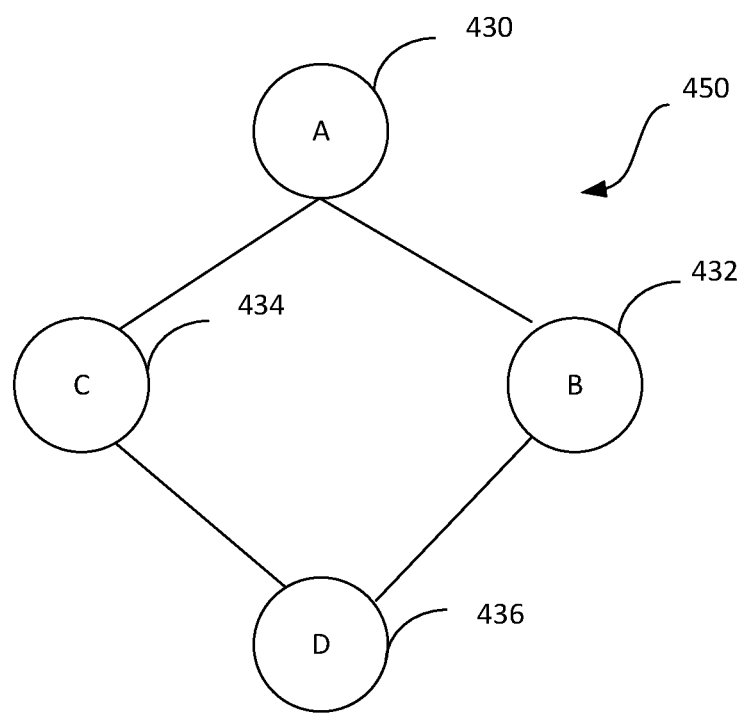
FIG. 4B is a graph representation of the verification test of FIG. 4A that is reconstructed based on user-implanted start time and end time of the test actions, according to some embodiments of the present invention.

FIG. 4B is a graph representation 450 of the verification test of FIG. 4A that is reconstructed based on user-implanted start time and end time of the test actions, according to some embodiments of the present invention. Given the order of start and end times that were recorded in the log file (FIG. 4A), the graph representation of the test includes a first action A 430, which is followed by two concurrent actions B 432 and C 434, which are then followed by action D 436.

In general, an action precedes other actions if its start time and end time precede the start times of these other actions. In particular, an action may be linked by a line (sometimes also referred to as arc or edge) to another action in the reconstructed graph representation of the verification test if the end time of that action precedes the start time of the other action, and there are no other actions whose both start time and end time occurred between the end time of the first action and the start time of the other action.

If the start time of one action precedes the start time of another action but the start time of the other action precedes the end time of the first action, then these two actions are considered as concurrent actions. The concurrent actions are not linked by a line, but are each linked by lines, in the graph representation of the test, to the last previous action and to the next first action.

An executed test may include an action whose execution had started but has not ended. For example, the execution was prematurely halted before that action has completed, or the execution was faulty for other reasons and as a result that particular action did not end. In such instances the EDA tool may refer to that action as an action that continues endlessly, and show that action as a concurrent action to all other actions that were executing when that action started or started after the start time of that action and ended (or did not end).

In analyzing the log file it may also be possible to determine other features and characteristics of the verification test whose log file was analyzed.

Once a graph representation of the test is completed, the EDA tool may be used to apply other functions and actions on that test, for example, debugging, identifying errors in the test or in the DUT, and identifying errors in a testbench of the DUT.

For example, the user may input one or a plurality of constraints and the EDA tool may be able to verify whether the test complies with these constrains by considering and analyzing the reconstructed graph representation of the test. For example, if the user inputs a constraint that forbids action A to be executed before action B, the EDA tool, using the graph representation of the test, may analyze the structure of the graph and determine that this test does not comply with that particular constraint.

Figure 5:
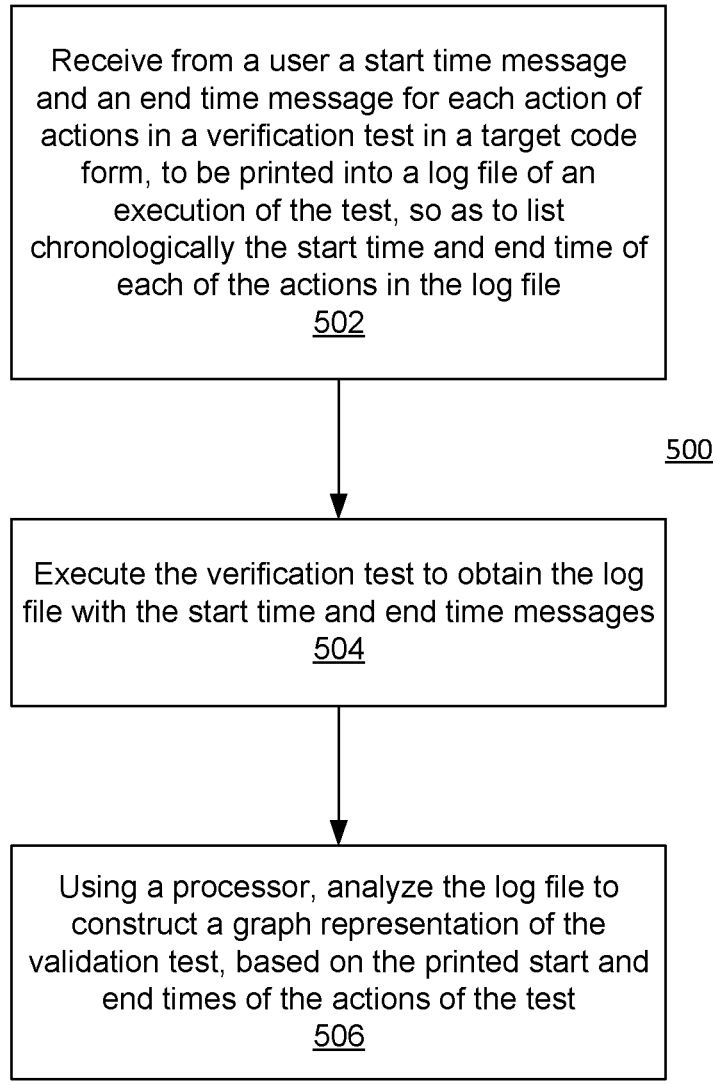
FIG. 5 shows a method for processing verification tests for testing a design under test (DUT), according to some embodiments of the present invention.

FIG. 5 shows a method 500 for processing verification tests for testing a design under test (DUT), according to some embodiments of the present invention.

Method 500 may include receiving 502 from a user a start time message and an end time message for each action of actions in a verification test in a target code form, to be printed into a log file of an execution of the test, so as to list chronologically the start time and end time of each of the actions in the log file. Method 500 may also include executing 504 the verification test to obtain the log file with the start time and end time messages; and using a processor, analyzing 506 the log file to construct a graph representation of the validation test, based on the printed start and end times of the actions of the test.

In some embodiments of the present invention the user is prompted to input the start time and end time messages.

In some embodiments of the present invention method 500 may also include obtaining from the user (e.g., by prompting the user to enter) additional messages to be printed into the log file.

In some embodiments of the invention, in the constructed graph representation of the validation test an action of said actions is linked by a line to another action of said actions if the end time of that action precedes the start time of the other action, and there are no other actions of said actions whose both start time and end time occurred between the end time of that action and the start time of the other action.

In some embodiments of the invention, in the reconstructed graph representation of the validation test, if the start time of one action precedes the start time of another action but the start time of the other action precedes the end time of that action, then these two actions are presented as concurrent actions.

In some embodiments of the invention, the method may further include, using the processor, applying one or a plurality of functions on the graph representation of the verification test, using an EDA tool.

These functions may be selected from the group of functions consisting of debugging, identifying errors in the test or in the DUT, identifying errors in a testbench of the DUT, and applying constraints.

Figure 6:
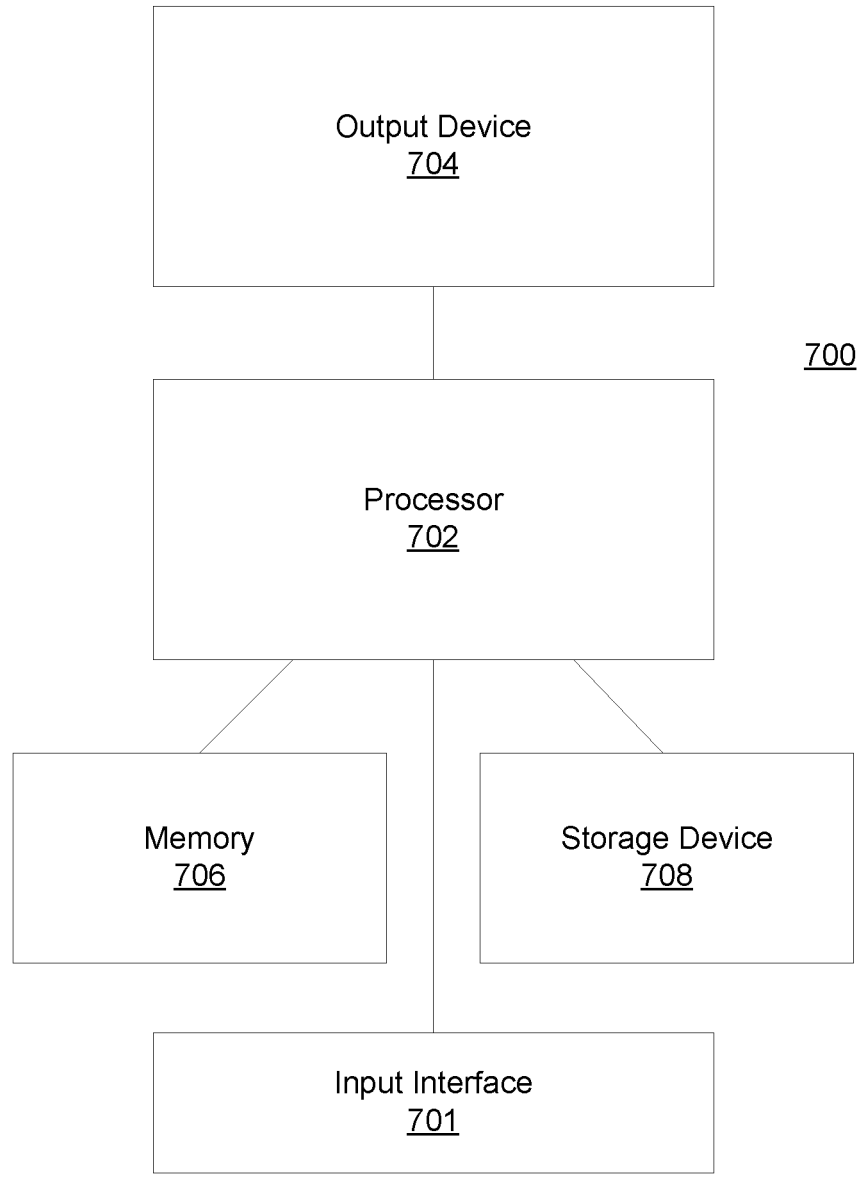
FIG. 6 illustrates a system for generating a validation test, according to some embodiments of the present invention.

FIG. 6 illustrates a system 700 for processing verification tests for testing a design under test (DUT), according to some embodiments of the present invention. System 700 may include a processor 702 (e.g. single processor or a processing unit made that includes a plurality of processors, on a single machine or distributed on a plurality of machines) for executing a method according to some embodiments of the present invention. Processing unit 702 may be configured to analyze a validated scenario that includes a plurality of actions to identify executables and variables relating to each of the actions; to identify actions in the plurality of actions that relate to different executables and refer to a same variable of said variables that is to be written to or read from a shared memory assigned to the different executables; and to generate a test code for the validated scenario that includes one or a plurality of access protection commands to manage access by the actions that relate to the different executables and refer to the same variable.

In accordance with some embodiments of the present invention, the process of generating test code for verification may become more automated, freeing the user from having to manually review generated test code to determine whether access management commands have to be added to the code. Not only is such work a tedious job, but a human user is typically unable to effectively cover large code files and thus error may result that may result in significant waste of resources (human time and computing resources), which may be saved by employing systems and methods according to some embodiments of the present invention. Furthermore, automatically including access management commands in the code may free the programmers from some planning considerations when allocating memory for the DUT, or at least reduce some of these considerations and therefore has the potential to shorten verification time and to render the verification process more efficient.

Processor 702 may be linked with memory 706 on which a program implementing a method according to some embodiments of the present invention and corresponding data may be loaded and run from, and storage device 708, which includes a non-transitory computer readable medium (or mediums) such as, for example, one or a plurality of hard disks, flash memory devices, etc. on which a program implementing a method according to some embodiments of the present invention and corresponding data may be stored. System 700 may further include an output device 704 (e.g. display device such as CRT, LCD, LED etc.) on which one or a plurality user interfaces associated with a program implementing a method according to some embodiments of the present invention and corresponding data may be presented. System 700 may also include input interface 701, such as, for example, one or a plurality of keyboards, pointing devices, touch sensitive surfaces (e.g. touch sensitive screens), etc. for allowing a user to input commands and data.

Some embodiments of the present invention may be embodied in the form of a system, a method or a computer program product. Similarly, some embodiments may be embodied as hardware, software or a combination of both. Some embodiments may be embodied as a computer program product saved on one or more non-transitory computer readable medium (or media) in the form of computer readable program code embodied thereon. Such non-transitory computer readable medium may include instructions that when executed cause a processor to execute method steps in accordance with examples. In some examples the instructions stored on the computer readable medium may be in the form of an installed application and in the form of an installation package.

Such instructions may be, for example, loaded by one or more processors and get executed.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

Some embodiments are described hereinabove with reference to flowcharts and/or block diagrams depicting methods, systems and computer program products according to various embodiments.

Features of various embodiments discussed herein may be used with other embodiments discussed herein. The foregoing description of the embodiments has been presented for the purposes of illustration and description. It is not intended to be exhaustive or limiting to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes that fall within the true spirit of the present invention.

The invention claimed is:

1. A method for processing verification tests for testing a design under test (DUT), the method comprising:
   for each action in a verification test, receiving from a user a message print command to print into a log file a start time of the action and a message print command to print into the log file an end time of the action, to be implanted in a target code of the verification test;

executing the verification test to obtain the log file with the start and end times of the actions of the verification test; and using a processor, analyzing the log file to construct a directed graph representation of the verification test, based on the printed start and end times of the actions of the verification test, wherein the actions of the verification test are vertices in the directed graph, which are connected by directed edges.

2. The method of claim 1, wherein the user is prompted to input the message print commands.

3. The method of claim 1, further comprising obtaining from the user additional messages to be printed into the log file.

4. The method of claim 1, wherein in the constructed directed graph representation of the verification test an action of said actions is linked by a directed edge to another action of said actions if the end time of that action precedes the start time of the other action, and there are no other actions of said actions whose both start time and end time occurred between the end time of that action and the start time of the other action.

5. The method of claim 1, wherein in the reconstructed directed graph representation of the verification test, if the start time of one action precedes the start time of another action but the start time of the other action precedes the end time of that action, then these two actions are presented as concurrent actions.

6. The method of claim 1, further comprising, using the processor, applying one or a plurality of functions on the directed graph representation of the verification test, using an EDA tool.

7. The method of claim 6, wherein said plurality of functions are selected from the group of functions consisting of debugging, identifying errors in the test or in the DUT, identifying errors in a testbench of the DUT, and applying constraints.

8. A non-transitory computer readable storage medium for processing verification tests for testing a design under test (DUT), having stored thereon instructions that when executed by a processor will cause the processor to:

for each action in a verification test, receive from a user a message print command to print into a log file a start time of the action and a message print command to print into the log file an end time of the action, to be implanted in a target code of the verification test;

execute the verification test to obtain the log file with the start and end times of the actions of the verification test; and using a processor, analyze the log file to construct a directed graph representation of the verification test, based on the printed start and end times of said plurality of actions of the verification test, wherein the actions of the verification test are vertices in the directed graph, which are connected by directed edges.

9. The non-transitory computer readable storage medium of claim 8, wherein the instructions include prompting the user to input the message print commands.

10. The non-transitory computer readable storage medium of claim 8, wherein the instructions when executed by a processor will further cause the processor to obtain from the user additional messages to be printed into the log file.

11. The non-transitory computer readable storage medium of claim 8, wherein in the constructed directed graph representation of the verification test an action of said actions is linked by a directed edge to another action of said actions if the end time of that action precedes the start time of the other action, and there are no other actions of said actions whose both start time and end time occurred between the end time of that action and the start time of the other action.

12. The non-transitory computer readable storage medium of claim 8, wherein in the reconstructed directed graph representation of the verification test, if the start time of one action precedes the start time of another action but the start time of the other action precedes the end time of that action, then these two actions are presented as concurrent actions.

13. The non-transitory computer readable storage medium of claim 8, wherein the instructions when executed by a processor will further cause the processor to apply one or a plurality of functions on the directed graph representation of the verification test, using an EDA tool.

14. The non-transitory computer readable storage medium of claim 13, wherein said plurality of functions are selected from the group of functions consisting of debugging, identifying errors in the test or in the DUT, identifying errors in a testbench of the DUT, and applying constraints.

15. A system for processing verification tests for testing a design under test (DUT), the system comprising:

a memory; and a processor configured to:

for each action in a verification test, receive from a user a message print command to print into a log file a start time of the action and a message print command to print into the log file an end time of the action, to be implanted in a target code of the verification test;

execute the verification test to obtain the log file with the start and end times of the actions of the verification test; and analyze the log file to construct a directed graph representation of the verification test, based on the printed start and end times of said plurality of actions of the verification test, wherein the actions of the verification test are vertices in the directed graph, which are connected by directed edges.

16. The system of claim 15, wherein the processor is configured to prompt the user to input the message print commands.

17. The system of claim 15, wherein the processor is configured to obtain from the user additional messages to be printed into the log file.

18. The system of claim 15, wherein in the constructed directed graph representation of the verification test an action of said actions is linked by a directed edge to another action of said actions if the end time of that action precedes the start time of the other action, and there are no other actions of said actions whose both start time and end time occurred between the end time of that action and the start time of the other action.

19. The system of claim 15, wherein in the reconstructed directed graph representation of the verification test, if the start time of one action precedes the start time of another action but the start time of the other action precedes the end time of that action, then these two actions are presented as concurrent actions.

20. The system of claim 15, wherein the processor is configured to apply one or a plurality of functions on the directed graph representation of the verification test, using an EDA tool.

* * * * *